Figure 8:
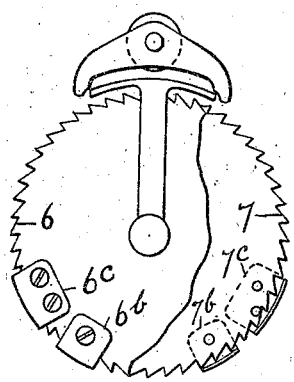

H. BULLOCK.
REGULATING APPARATUS.
APPLICATION FILED MAY 4, 1912.

1,073,025.

Patented Sept. 9, 1913.
5 SHEETS—SHEET 1.

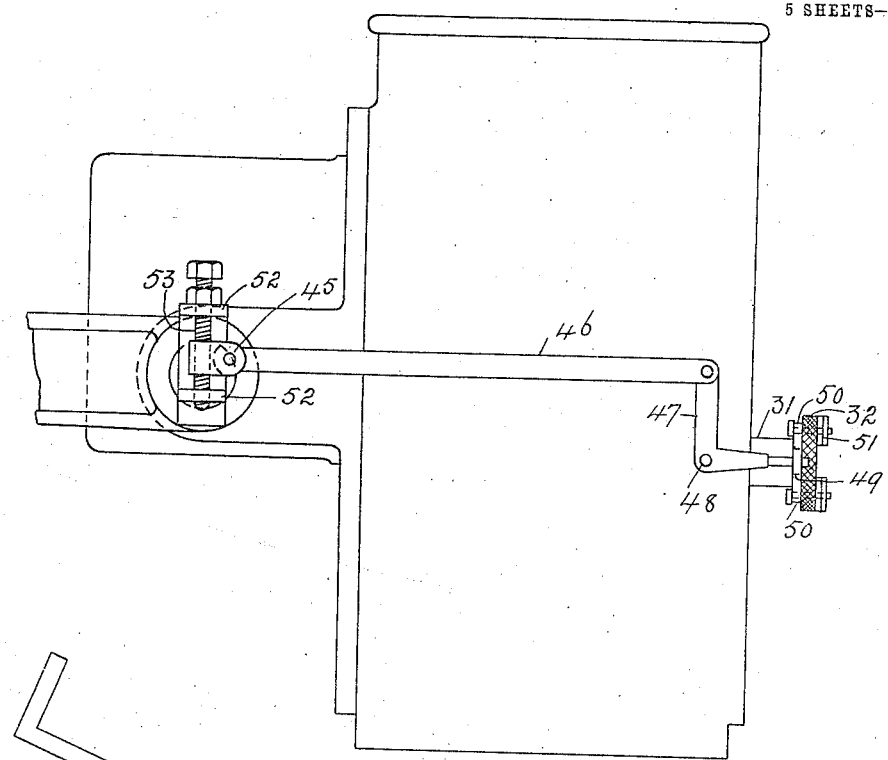
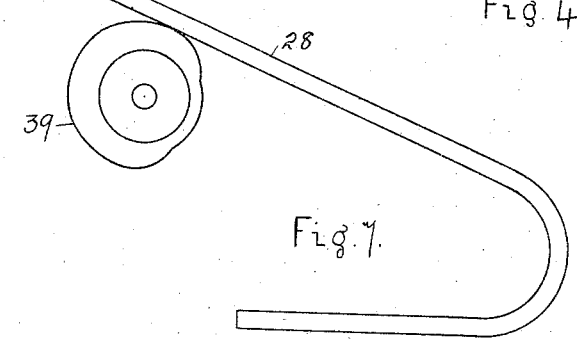
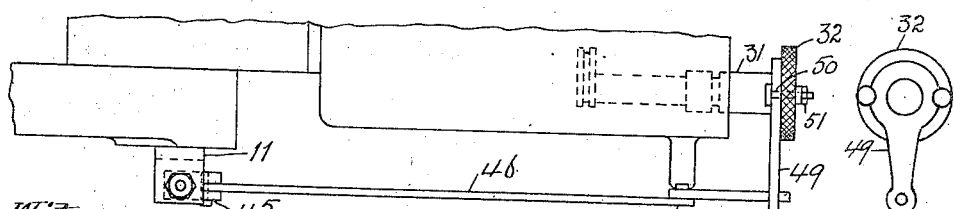

H. BULLOCK.
REGULATING APPARATUS.
APPLICATION FILED MAY 4, 1912.

1,073,025.

Patented Sept. 9, 1913.
5 SHEETS—SHEET 5.

Witnesses.
R. J. Mawhinney
H. H. Byrne

Inventor.
Herbert Bullock
by Wilkinson, Witherspoon
& Mackey
Attorneys

UNITED STATES PATENT OFFICE.

HERBERT BULLOCK, OF BRADFORD, ENGLAND.

REGULATING APPARATUS.

1,073,025.   Specification of Letters Patent.   Patented Sept. 9, 1913.

Application filed May 4, 1912. Serial No. 695,109.

*To all whom it may concern:*

Be it known that I, HERBERT BULLOCK, a subject of the King of Great Britain, residing at 13 Northdale road, Frizinghall, Bradford, Yorkshire, England, have invented certain new and useful Improvements in Regulating Apparatus; and I do hereby declare the following to be a full, clear, and exact description of the invention, such as will enable others skilled in the art to which it appertains to make and use the same.

This invention relates to improvements in relay apparatus or regulating means applicable to a large number of purposes in which it is desired to effect a regulation according to alterations from the normal or a desired condition in the device or apparatus in connection with which the relay is used.

Among the different objects to which the relay is applicable may be mentioned the regulating of the draft in balanced draft systems for furnaces by the pressure ruling in the boilers, the speed at which an automatic stoker works according to the pressure of steam in the boiler or according to the temperature in the part to be heated by the furnace, the speed at which carbons in arc lamps are fed together according to the resistance between the carbons, the rate at which blowers or the like are operated according to the pressure produced by the said blowers and analogous purposes.

In the accompanying drawings the invention is illustrated by way of example as applied to the rotation in one direction or other of a spindle such as can be connected up to the dampers in a balanced draft system for boiler furnaces and to the rotation of a spindle in one direction such as may be connected up to the feed for an automatic stoker for boiler furnaces, the relay device itself being controlled by the pressure of steam in the boiler through a Bourdon tube. In this case the spindle may be termed "the mechanism which is operated" and the Bourdon tube the controlling device which is subjected to and automatically adjusted by alterations from the normal or desired condition of the part or mechanism of which it is desired to keep the temperature or pressure or other condition as the case may be constant or approximately so. For the purposes of description the Bourdon gage or its equivalent will be shortly termed "the controlling device".

The objects of the invention are:—to provide a relay mechanism which shall be very sensitive to slight variations in the condition to be controlled. Further to arrange so that the amount of movement imparted to the mechanism which is operated may automatically vary or be varied by hand adjustment relative to the amount of movement of the controlling device. Further to arrange that a slight variation in the condition to be controlled or of the controlling device may only result in a relatively small movement (or if desired relatively large movement) of the mechanism which is operated while a further variation as above may result in a relatively large (or if desired relatively small) movement of the mechanism which is operated. Further to arrange for the mechanism to be operated to take up definite fixed positions corresponding to the respective pressures within the range of the regulator. Further to arrange so that the relative speed of movement imparted to the mechanism which is operated may be relatively larger for the variation in the condition to be controlled on one side of the normal condition than the amount of movement imparted to the said mechanism for a corresponding amount of variation on the other side of the normal or desired condition.

Figure 9:
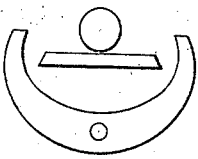
Figure 1:
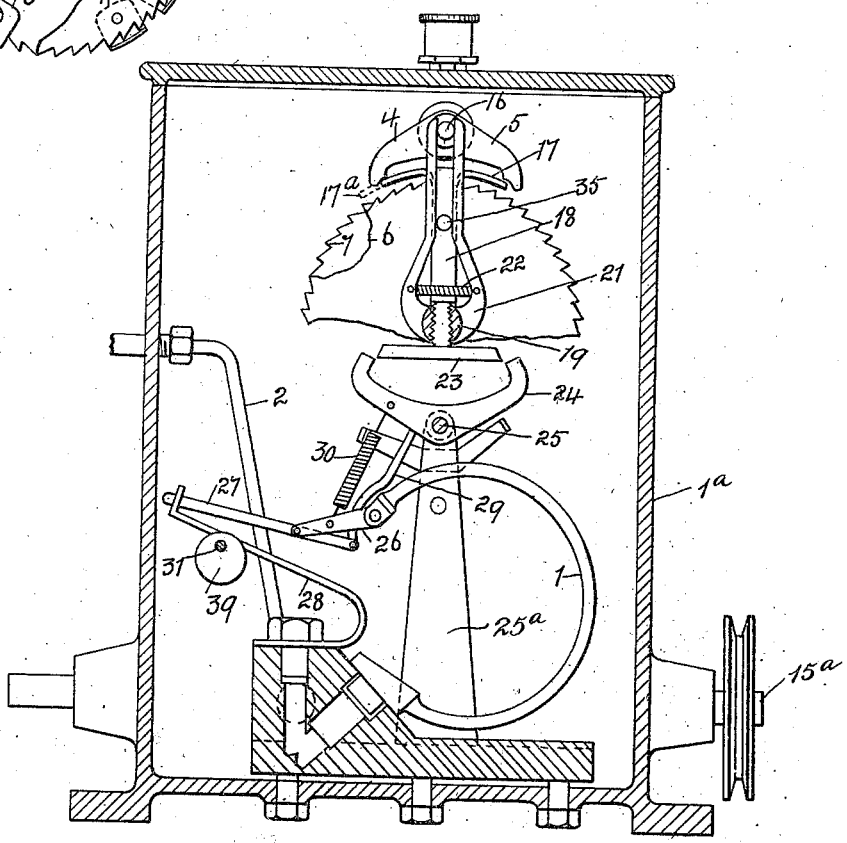
Figure 2:
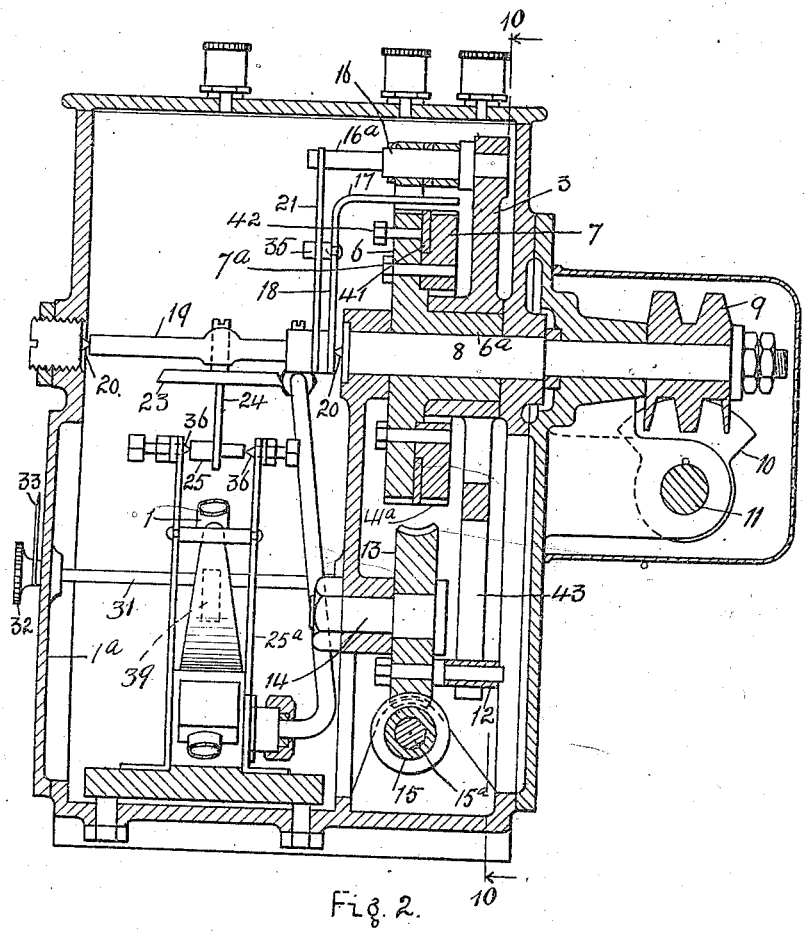
Figure 3:
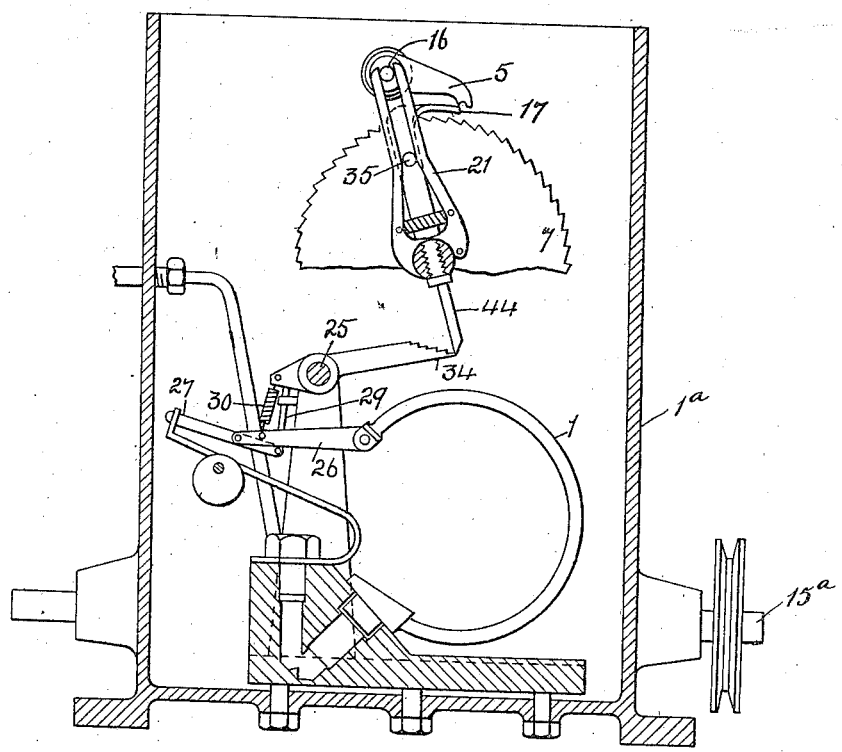
Figure 11:
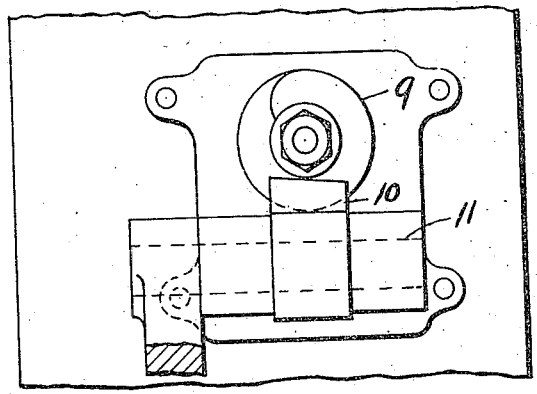
Figure 10:
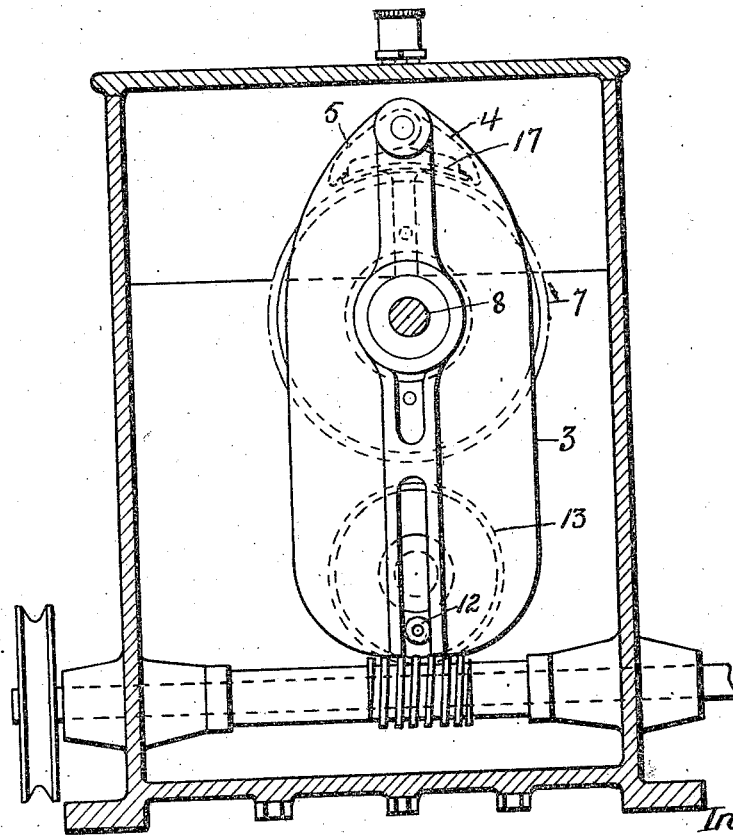

In the embodiment of the invention shown in the accompanying drawings:—Figure 1 is an end elevation partly in section of an apparatus adapted for controlling the dampers in a boiler furnace. Fig. 2 is a vertical axial cross section of Fig. 1. Fig. 3 is an end elevation partially in section of the device as modified for controlling the movement in one direction of the part to be operated such as the feed of a mechanical stoker. Fig. 4 is an elevation of the device showing the means for automatically adjusting the relative rates of movement of the controlling device and the mechanism which is to be operated. Fig. 5 is a plan view of Fig. 4. Figs. 6 and 7 are small detail views hereinafter referred to. Fig. 8 is a diagrammatic view of different arrangement of shield hereinafter referred to. Fig. 9 shows a modified form of pallet hereinafter referred to. Fig. 10 is a sectional view taken on the line 10-10 of Fig. 2; and Fig. 11 is a detail view, in elevation, of the transmission gearing between the device and the part to be controlled.

In these drawings 1 is a Bourdon tube, acting as the controlling device, suitably connected by the pipe 2 to a source of pressure, in this case supposed to be a boiler, the dampers in the flues of which are controlled by the relay mechanism. The relay mechanism itself consists of the arm 3 which is provided with reversed pawls or engaging means 4 and 5 which rock over a ratchet wheel with reversed sets of teeth 6 and 7. This ratchet wheel is firmly mounted on a central spindle 8 carrying a worm 9 which controls by means of the toothed sector 10 a rod or spindle 11, which as before stated is in this example the mechanism which is operated. The ratchet wheel is provided with a boss $6^a$ and loosely mounted thereby on the spindle 8. The reversed set of teeth 6 is secured to the main part of the ratchet wheel carrying the set of teeth 7 by suitable screws or bolts $7^a$. The pawl arm 3 is mounted so as to swing freely about the boss $6^a$. The lower end of the pawl arm 3 is provided with a slot 43 in which is located a crank pin 12 mounted on the side of the worm wheel 13 which latter is mounted on a stud 14 and continuously rotated from the worm 15 mounted on a continuously rotating shaft $15^a$. The pawls 4 and 5 are mounted on a stud 16 which is rigidly secured to and projects from the rocking pawl arm 3. Between the engaging means or pawls and the reversed ratchet wheel is arranged a shield 17 which is of sufficient length to cover in its central position those parts of the ratchet wheel under both pawls so as to hold these latter normally out of engagement with the corresponding sets of teeth. This shield 17 is formed integral with or supported by a radial arm 18 rigidly mounted on the spindle 19 carried by needle point bearings 20. Also mounted on the spindle 19 so as to be capable of turning freely about the same are two upstanding fingers 21 connected together by a spring 22 so that their upper and outer extremities lie against or partially embrace the stud 35 on the radial arm 18 carrying the shield 17. These upstanding fingers 21 also partially embrace or normally rest against an extension $16^a$ of the stud 16 upon which the pawls 4 and 5 are mounted. The shaft 19 has secured to its underside the chamfered disk 23 which is located just above a double pallet 24 mounted upon a stud 25 bearing with needle point bearings 36 in suitable supports $25^a$ forming an escapement device. The Bourdon gage 1 is connected by a link 26 to a lever 27. This lever 27 at its free end slides in the end of a spring 28 which forms a fulcrum for it. The other end of the lever 27 carries an upstanding rod 29 the outer end of which under normal conditions just touches the underside of the double pallet 24. This pallet is also connected to the link 26 by means of a tension spring 30. On the casing $1^a$ of the device there is mounted a spindle 31 which is provided with a thumb nut 32 and if desired with a pointer or indicator 33. This spindle 31 carries a cam or eccentric 39 which supports one end of the spring 28 the eccentric or cam 39 being capable of being turned from the thumb nut 32 to raise and lower the spring 28.

In Figs. 4, 5 and 6 the spindle 11 is provided at the outside with a double bracket 52 carrying a screw threaded bolt 53 upon which is mounted a nut 45 one side of which is pivoted to a link 46. This link is also connected to a bell crank lever 47 pivoted to the outer case of the apparatus at 48 and connected by its other end to a loosely mounted crank 49 on the spindle 31. The thumb nut 32 carries two bolts 50 the heads of which engage slightly over the crank 49 shown in Figs. 5 and 6, the said bolts being capable of being tightened so as to hold the crank 49 against the thumb nut by suitable nuts 51.

The action of the device thus far described is as follows: The shaft $15^a$ is continually rotated and continuously rotates the worm wheel 13 through the worm 15 which worm wheel 13 by means of the crank pin 12 oscillates the pawl arm 3 with its projecting stud 16 and the pawls or engaging means 4 and 5. The oscillations of the extension $16^a$ of the stud 16 cause the fingers 21 also to oscillate. These fingers 21 in turn, owing to the stud 35, cause the shield 17 to oscillate with the pawls and so oscillate the shaft 19 and the chamfered disk 23. This is the action under normal conditions. On however the pressure in the Bourdon gage rising the same will open somewhat and in opening lift the lever 27 and cause the upstanding rod 29 to tilt the pallet 24 against the action of the spring 30. This tilting of the pallet will cause the left hand arm of the same to rise into the path of the oscillating disk 23 and so prevent it from being moved to the left hand and will so prevent the shield from being moved to the right. This however will not prevent the pawls from continuing to oscillate so that the pawl 5 will in its oscillation drop off the shield 17 and come into contact with the ratchet wheel and the set of teeth 7 and so will rotate the same clockwise, which will rotate the spindle 8 in the same direction and so turn the shaft 11, that is to say, the mechanism which is to be operated. This mechanism to be operated or shaft 11 is, in the application of the invention shown, supposed to be connected to suitable means to reduce the pressure in the boiler for instance by closing the dampers in the flues. As the pressure falls the pallet 24 will resume its normal position so that the disk 23 can again rock and permit the shield to be oscillated to both sides as before.

Should the pressure drop to too great an extent the reverse action to the above will take place that is to say, the pawl 4 will be able to come into contact with the set of teeth 6 and turn the shaft 11 or mechanism to be operated in the reverse direction. It will be noted that the effect of holding the disk 23 against oscillation in one direction is to hold the radial arm 18 with its stud 35 also against oscillation. As the upstanding fingers 21 are only connected together by the spring 22 it will be obviously possible for the stud 35 to hold one against oscillation in one direction while the extension 16ᵃ on the stud 16 carries the other finger with it without oscillating the shield in the same direction.

By adjusting the thumb nut 32 the small eccentric or cam 39 is turned to raise or lower the free end of the spring 28 which will carry with it one end of the lever 27 and so lower or raise the rod 29 which actuates the pallet. Obviously by turning the cam or eccentric 39 so as to raise the rod 29 the variations in pressure required to cause the Bourdon gage to operate the pallet and cause it to catch the disk 23 in its oscillations will be diminished, while if the cam 39 be turned so as to lower the rod 29 the amount of variation in pressure needed to bring the relay into action will be increased. In the modification shown in Figs. 5, 6 and 7 the turning of the spindle 11 itself automatically turns the cam 39 so that the cam may be used to neutralize for a short period or to increase or again to decrease the transmission of motion from the Bourdon gage to the pallet in the same manner as if the hand nut 32 in Fig. 2 were turned by hand. If the cam be of the shape shown in Fig. 7 the turning of the cam from the spindle 11 will tend to diminish the amount of motion imparted by the Bourdon gage to the pallet in the early travel of the spindle 11 from its normal position. The further turning of this cam, however, will bring a concentric portion of the same under the spring so that any further turning beyond this point will not in any way affect the speed of transmission of the motion from the Bourdon gage to the pallet. Supposing for a moment that the device is being used for controlling the dampers in a boiler furnace according to the pressure in the boiler and the above shape of cam shown in Fig. 7 be used, on the relay operating owing to an increase of pressure the spindle 11 by turning will turn the cam 39 clockwise and cause the spring 28 to lower the rod 29 to allow the pallet to regain its central position and the relay will cease operating so that the damper remains stationary until a further variation in pressure causes the relay to operate again. On this further variation the operation will be repeated the damper being caused to take up definite positions for the different pressures, being moved step by step until the variation in pressure becomes great enough to bring the concentric portion of the cam under the spring after which its further turning will have no effect on the pallet which will then be solely affected by the Bourdon gage until the pressure begins to drop when the reverse of the action above described will take place.

Obviously a lowering of the pressure from the normal or desired pressure will cause the damper to move in the opposite direction and the cam will be turned in a counter clockwise direction. In this way the damper will have definite fixed positions corresponding to the respective pressures within the range of the regulator.

If the cam 39 has a uniform eccentricity it is obvious that the amplitude of movement of the damper will be uniform for a given variation in pressure throughout the entire range of pressure through which the regulator works; that is from the pressure at which the damper is in its position of minimum opening to the pressure at which the damper is in its position of maximum opening. It is also obvious that by changing the shape of the cam 39, varying amplitudes of movement of the damper or other mechanism can be obtained for a given variation of pressure or other condition at different points within the range of the regulator.

In Fig. 3 a relay device is shown in which a shaft is rotated in one direction only, the relay device not only rotating the shaft but regulating the speed at which it is rotated. In this case instead of the pallet 24 and disk 23 there is arranged a single finger 44 projecting from and rigidly secured to the spindle 19 and a single arm 34 one end of which is stepped and is raised at times into the path of the oscillating finger 44 the other end being secured to effect this result to the Bourdon gage tube 1 and being operated therefrom exactly in the same manner as described with reference to Fig. 1. The action of the stepped end of the swinging arm 34 is to allow the ratchet wheel 7 to be rotated at a smaller speed for small variations from the normal pressure. In the position shown in the drawings it is assumed that there is a large variation so that the shield 17 is held stationary by the arm 34, which permits the pawl 5 to force the ratchet wheel 7 around a maximum amount for each of its oscillations. On the arm falling a small amount owing to the variation from the normal decreasing, the finger 44 instead of being held against oscillation will oscillate the amount of the first step on the arm 34 which will cause the shield 17 to oscillate to the extent of one tooth on the ratchet wheel 7 and so decrease the travel imparted to the ratchet wheel by the pawl to the extent of one tooth.

This effect will take place to an increased extent as the arm is lowered and until it is quite out of the path of the finger 44 when the shield will rock entirely with the pawl 5 so that no rotation will be imparted to the ratchet wheel 7.

By making the shield in the arrangement shown in Fig. 1 somewhat larger on one side of its center than on the other as shown by dotted lines at 17ª the number of teeth operated by the respective pawls will be different so that it will be obvious without further explanation that it will be possible thereby to obtain quick movement of the mechanism to be operated in one direction and a slow movement in the other. Over each set of teeth 6 and 7 of the ratchet wheel there may be arranged a further permanently adjustable shield so that the total amount of movement imparted to the ratchet wheel will be limited to a predetermined amount. By this means it is possible to arrange that in the present case the dampers shall not be wholly closed if such a condition be desired or the travel of the lever may be regulated to any desired extent. For this purpose a ring 41 Fig. 2 carrying a shield 41ª and rotatably mounted between the two parts of the ratchet wheel may be used. This ring 41 may be clamped to the ratchet wheel in any desired position by means of the set screws 42. The shield 41ª will naturally have to cover up the ratchet wheel for a distance greater than the length of travel of the respective pawl (except as hereinafter described) so that the latter will cease to act on the ratchet wheel when it has turned the latter through the desired angle.

In a modification of the arrangement just described with a double pallet and reversed sets of teeth on the ratchet wheel the oscillating shield 17 may be used in conjunction with two fixed shields for each set of teeth adjustably attached to the ratchet wheel by means of the ring 41 as shown diagrammatically in Fig. 8 one of which shields 6ᵇ or 7ᵇ in each case covers a shorter arc of the ratchet wheel than the arc the pawl arm swings through and the other 6ᶜ or 7ᶜ a greater arc. In this case the pallet itself is formed as in Fig. 9 to vary the throw of the pawls according to the variation in pressure as is the case with the stepped arm 34 in Fig. 3. Owing to the shape of the pallet arms there is obviously no need for teeth to be formed on them. By this arrangement it is possible to arrange for the dampers, where such are being controlled or the corresponding part, to be controlled or operated to a limited extent unless the pressure or temperature or other condition varies to an excessive amount when the dampers could be completely closed. The reason for this is that if the number of teeth acted on by the pawl is limited by the shield 17 oscillating with the pawls to a certain extent, the shorter fixed shield will prevent the pawl from acting on the ratchet wheel. In this position the dampers or the like would be nearly closed. If for some reason this amount of closing is not sufficient and the pressure rises still further and the pallet entirely stops the movable shield 17 from oscillating with the pawls then the pawl can act on the teeth of the ratchet wheel behind the shorter shield and so rotate the ratchet wheel until the larger shield is reached.

In the foregoing description the relay device has only been described for controlling the dampers in boiler flues and for regulating the speed of operation of a mechanical stoker or the like. The device is, however, as stated above applicable for many other purposes and may be controlled by means of a thermostat or by electric or other means to control the desired condition.

I declare that what I claim is:—

1. In a relay apparatus for the purposes described, a mechanism to be operated, a controlling device, a ratchet wheel connected to the mechanism to be operated, a pawl device over said ratchet wheel, means for oscillating said pawl device about said ratchet wheel, a shield between said pawl device and the ratchet wheel, means for normally oscillating said shield synchronously with said pawl device to hold said pawl device out of engagement with said ratchet wheel; and means connected to said controlling device for at certain times arresting the said shield in its oscillation with said pawl device substantially as described.

2. In a relay apparatus for the purposes described, a mechanism to be operated, a controlling device, a ratchet and pawl device connected to said mechanism to be operated, a shield connected to and synchronously operable with the pawl devices adapted to normally hold said pawl devices in inoperative position; and an escapement device connected to said ratchet and pawl device and adapted to effect the release of said shield, the escapement being controlled by said controlling device.

3. In a relay apparatus for the purposes described, a mechanism to be operated, a controlling device, a constantly rotated shaft, an arm oscillated from said constantly rotated shaft, a toothed wheel connected to said mechanism to be operated, means for engaging with said toothed wheel mounted on said oscillating arm, a shield mounted between said toothed wheel and said engaging means and normally synchronously operable with said engaging means, means for normally oscillating said shield with said engaging means, means connected to said controlling device for at times arresting the oscillation of the shield substantially as described.

4. In a relay apparatus for the purposes described, a mechanism to be operated, a controlling device, a ratchet and pawl device connected to said mechanism to be operated; means for oscillating and normally holding the engaging means of said ratchet and pawl device in an inoperative position said holding means normally oscillating with said engaging means, an escapement device connected to said holding means said escapement being connected to the controlling device.

5. In a relay apparatus for the purposes described, a mechanism to be operated, a controlling device, a ratchet and pawl device connected to said mechanism to be operated, a shield located between the engaging means and ratchet of said ratchet and pawl device, means for oscillating the engaging means of said ratchet and pawl device, means for normally oscillating said shield with the engaging means of said ratchet and pawl device, means for at times arresting the said shield in its oscillation, said arresting means being connected to said controlling device.

6. In a relay apparatus for the purposes described, a mechanism to be operated, a controlling device, a ratchet and pawl mechanism connected to said mechanism to be operated means normally acting with said pawl mechanism for holding said ratchet and pawl mechanism inoperative, an escapement device, operative connections between said escapement device and said means for normally holding said ratchet and pawl device inoperative, said escapement itself being connected to said controlling device.

7. In a relay apparatus for the purposes described, a mechanism to be operated, a controlling device, a ratchet wheel, constantly oscillating means for engaging with said ratchet wheel, a constantly oscillated arm, a stud carried by said arm, the said stud carrying said engaging means, a shield located between said engaging means and said ratchet wheel, a shaft co-axial with said ratchet wheel, an arm on said shaft carrying said shield, means loosely mounted on said shaft engaging with said radial arm and with said stud to normally oscillate said shield with said engaging means, means connected to said controlling device for at times arresting the shield in its oscillation with said engaging means.

8. In a relay apparatus for the purposes described, a mechanism to be operated, a controlling device, a ratchet wheel connected to said mechanism to be operated, means for engaging with said ratchet wheel, means for constantly oscillating said engaging means about said ratchet wheel, a stud carrying said engaging means, a shield located between said ratchet wheel and said engaging means, a shaft co-axial with said ratchet wheel, an arm rigidly secured to said shaft and carrying said shield, a projection from said engaging means, loose upstanding fingers mounted on said shaft and extending each up one side of said radial arm supporting said shield and on one side of the said extension, a tension spring between said upstanding fingers and an escapement device, one part mounted on said shaft and another part connected to said controlling device substantially as described.

9. In a relay apparatus for the purposes described, a mechanism to be operated, a controlling device, a ratchet wheel connected to said controlling device, engaging means for said ratchet wheel, means for oscillating said engaging means to and fro over said ratchet wheel, a shield located between said engaging means and said ratchet wheel, spring means between said engaging means and said shield for normally oscillating said shield with said engaging means and means connected to said controlling device for at times arresting the oscillation of said shield with said engaging device.

10. In a relay apparatus for the purposes described, a mechanism to be operated, a controlling device, a ratchet wheel connected to said mechanism to be operated, engaging means for said ratchet wheel, means for oscillating said engaging means about said ratchet wheel, holding means for holding said engaging means out of operative connection with said ratchet wheel, said holding means normally oscillating with said engaging means, a part rigidly connected to said shield, an angularly adjustable device, means for conveying motion from said controlling device to said angularly adjustable device to bring said angularly adjustable device into the path of said oscillating part connected to said shield.

11. In a relay apparatus for the purposes described, a mechanism to be operated, a controlling device, a ratchet wheel connected to said mechanism to be operated, engaging means for said ratchet wheel, means for oscillating said engaging means, a shield between said engaging means and said ratchet wheel, means for normally oscillating said shield with said engaging means, angularly adjustable means for at times arresting the oscillation of said shield with said engaging means, a rod located to engage with said angularly adjustable means, a lever carrying said rod, a link connected to said lever and to said controlling device, a spring supporting the end of said lever away from said rod and means for raising and lowering said spring.

12. In a relay apparatus for the purposes described, a mechanism to be operated, a controlling device, a ratchet wheel connected to said mechanism to be operated, engaging means for said ratchet wheel, means for oscillating said engaging means, a shield between said engaging means and said ratchet wheel, means for normally oscillating said shield with said engaging means, angularly adjustable means for at times arresting the oscillation of said shield with said engaging means, a rod located to engage with said angularly adjustable means, a lever carrying said rod, a link connected to said lever and to said controlling device, a spring supporting the end of said lever away from said rod, an eccentric supporting said spring, a shaft carrying said eccentric and operative connections between the mechanism to be operated and said shaft to automatically adjust said shaft.

13. In a relay mechanism in which a ratchet wheel is operated by constantly oscillated engaging means normally held out of engagement with the ratchet wheel by a shield controlled by an escapement device, said shield being connected to normally operate with said engaging means; a controlling device, operative connections between said controlling device and said escapement and means for adjusting the ratio of transmission of motion from said controlling device to said escapement.

14. In a relay apparatus for the purposes described, a mechanism to be operated, a controlling device, a ratchet wheel operatively connected to said mechanism to be operated, said ratchet wheel having reversed sets of teeth, two pawls adapted to engage one with each of said sets of teeth, a stud carrying said pawls, an arm carrying said stud, means for constantly oscillating said arm, a shield located between said pawls and the ratchet wheel, means for normally oscillating said shield with said pawls, means connected to said oscillating means for at times arresting the oscillation of said shield.

15. In a relay apparatus such as described a mechanism to be operated, a controlling device, a ratchet wheel carrying rings of opposing teeth, two pawls arranged one over each of said sets of teeth of said ratchet wheel, means for oscillating said pawls, a shield located between said pawls and said ratchet wheel, means for oscillating said shield with said pawls, a shaft coaxial with said ratchet wheel, an arm rigidly mounted on said shaft and carrying said shield, a disk mounted on said shaft, a pallet arranged in relation to said disk to form an escapement device, operative connections between said controlling device and said pallet.

16. In a relay apparatus such as described a mechanism to be operated, a controlling device, a ratchet wheel carrying rings of opposing teeth, two pawls arranged one over each of said sets of teeth of said ratchet wheel, means for oscillating said pawls, a shield located between said pawls and said ratchet wheel, means for oscillating said shield with said pawls, a shaft coaxial with said ratchet wheel, an arm rigidly mounted on said shaft and carrying said shield, a disk mounted on said shaft, a pallet arranged in relation to said disk to form an escapement device, an upstanding rod under one side of said pallet, a spring connected to said pallet to press the same on to said rod, a lever supporting said rod, a link connected to said lever and carrying one end of said spring and connected to the controlling device, a spring supporting said lever toward one end, means for adjusting the point of support between the said lever and said rod along the length of said lever substantially as described.

17. In a relay apparatus such as described a mechanism to be operated, a controlling device, a ratchet wheel carrying rings of opposing teeth, two pawls arranged one over each of said sets of teeth of said ratchet wheel, means for oscillating said pawls, a shield located between said pawls and said ratchet wheel, means for oscillating said shield with said pawls, a shaft coaxial with said ratchet wheel, an arm rigidly mounted on said shaft and carrying said shield, means connected to and operated by said controlling device to limit the amount of travel of the shield with the pawls and a permanently adjustable shield mounted to rotate with said ratchet wheel substantially as described and for the purpose set forth.

18. In a relay apparatus such as described a mechanism to be operated, a controlling device, a ratchet wheel carrying rings of opposing teeth, two pawls arranged one over each of said sets of teeth of said ratchet wheel, means for oscillating said pawls, a shield located between said pawls and said ratchet wheel, means for oscillating said shield with said pawls, a shaft coaxial with said ratchet wheel, an arm rigidly mounted on said shaft and carrying said shield, means connected to and operated by said controlling device to limit the amount of travel of the shield with the pawls and a permanently adjustable shield of a length somewhat less than the half of the total travel of the pawls in combination with a further permanently adjustable shield of a length greater than half the total travel of the pawls substantially as and for the purpose described.

19. In a relay apparatus such as described a mechanism to be operated, a controlling device, a ratchet wheel carrying rings of opposing teeth, two pawls arranged one over each of said sets of teeth of said ratchet wheel, means for oscillating said pawls, a shield located between said pawls and said ratchet wheel, means for oscillating said shield with said pawls, a shaft coaxial with said ratchet wheel, an arm rigidly mounted on said shaft and carrying said shield, means connected to and operated by said controlling device to limit the amount of travel of the shield with the pawls, and means for varying the transmission of movement from the controlling device to the means for limiting the travel of the shield according to the position of the mechanism to be operated.

In testimony whereof, I affix my signature, in presence of two witnesses.

HERBERT BULLOCK.

Witnesses:
 HUBERT PUMPHREY,
 LUCY RANEY.